Figure 1:
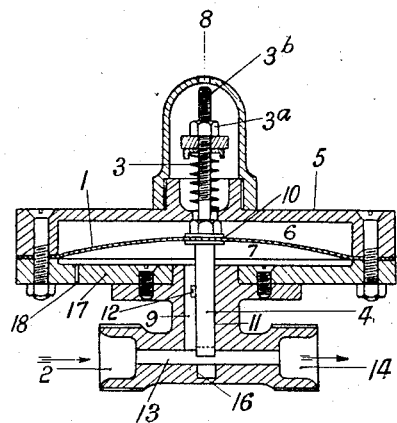

July 26, 1927.

A. R. MILLER 1,636,919

PRESSURE REGULATING VALVE

Filed March 30, 1927

Inventor:
Archibold Russell Miller,
by [signature]
Attorneys.

Patented July 26, 1927.

1,636,919

UNITED STATES PATENT OFFICE.

ARCHIBALD RUSSELL MILLER, OF HELENSBURGH, SCOTLAND.

PRESSURE-REGULATING VALVE.

Application filed March 30, 1927. Serial No. 179,513.

This invention relates to pressure regulating valves of the type which are designed to render constant the degree of vacuum prevailing in a conduit where the action of the vacuum generator is intermittent or where the degree of vacuum produced by such generator is liable to fluctuation.

The invention is more particularly concerned with that type of pressure regulating valve which includes a flexible diaphragm exposed on one side to the pressure in the conduit in which it is desired to maintain the constant degree of vacuum and movable in opposition to a variable load constituted, for example, by a spring of which the compression is adjustable to close or constrict an opening connecting the vacuum generator with the conduit.

In valves of this type it is usual to house the diaphragm in a diaphragm chamber partitioned into two compartments by the diaphragm, one compartment, regarded for convenience of description as the atmosphere compartment, being open to the atmosphere, and the other compartment, regarded for convenience of description as the vacuum compartment, being exposed to vacuum or sub-atmospheric pressure through a passage connecting the vacuum compartment with the conduit in which the vacuum is to be maintained constant.

The valve usually takes the form of a valve spindle connected to the diaphragm and slidable in a guide, the free end of the valve spindle entering a throat interposed between a conduit leading to the vacuum generator and the conduit in which the vacuum is to be maintained constant and serving to increase or to reduce the effective cross sectional area of the throat according to the influence of the vacuum on the diaphragm.

Pressure regulating valves of this type have proved in practice to be unreliable. As a result of experimental research it has been ascertained that the failure of the valve has been due to leakage past the valve spindle, the leak connecting the vacuum compartment directly with the conduit leading to the vacuum generator. The remedy would appear to consist in making the valve faces a closer fit but, with delicate apparatus of this type which must necessarily be responsive to slight fluctuations in vacuum, tightly fitting parts tend to produce sluggish operation of the working parts.

The invention which has for its object to furnish a simple and effective remedy for the defects of the prior apparatus provides compensation for the leakage past the valve by the introduction of atmospheric air to the conduit in which the degree of vacuum is to be maintained constant through an aperture of which the cross sectional area is substantially commensurate with the area of the valve leak.

Figure 2:
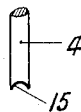

In the drawings which illustrate a pressure regulating valve constructed in accordance with the invention, Fig. 1 is a vertical section and Fig. 2 a fragmentary view of the valve spindle.

The pressure regulating valve shown includes a flexible diaphragm 1 exposed on one side to the pressure in the conduit 2 in which it is desired to maintain the constant degree of vacuum and movable to control the valve opening in opposition to a variable load constituted by a spring 3 of which the compression is adjustable by means of a nut 3$^a$ in screw-threaded engagement with an extension 3$^b$ of the valve spindle 4.

The diaphragm 1 is housed in a diaphragm chamber 5 partitioned into two compartments 6, 7 by the diaphragm, the compartment 6, regarded conveniently as the atmosphere compartment, being open to the atmosphere by way of an orifice 8, and the compartment 7, regarded conveniently as the vacuum compartment, being exposed to vacuum or sub-atmospheric pressure through a passage 9 connecting the compartment 7 with the conduit 2.

The valve spindle 4 is connected to the diaphragm at 10 and is slidable in a guide 11 located to one side of the passage 9, the passage 9 being formed as a featherway accommodating a feather-forming stud 12 serving to prevent circular movement of the spindle. The free end of the valve spindle 4 enters a throat 13 interposed between the conduit 14 leading to the vacuum generator and the conduit 2 serves to increase or to reduce the effective cross sectional area of the throat according to the influence of the vacuum in the compartment 7 on the diaphragm 1.

The extreme end of the spindle 4 is formed with a notch 15 which, when the valve is almost closed, involves greater movement of the valve for relatively little change in the area of the valve opening. The extreme end of the spindle 4 enters a well 16 in the throat 13.

It will be seen that leakage past the valve spindle connects the vacuum compartment 7 directly with the conduit 14. To compensate for such leakage there is formed in the wall 17 of the compartment 7 an aperture 18 which admits atmospheric air to the compartment 7.

The cross sectional area of the aperture 18 is so chosen that the volume of air entering the compartment 7 is no less than the volume of air leaking past the valve.

I claim:—

1. In a pressure regulating valve of the kind described, a conduit exposed to vacuum, a conduit in which the degree of vacuum is to be maintained constant, a throat connecting said conduits, a valve controlling the effective cross sectional area of said throat, a diaphragm chamber, a flexible loaded diaphragm partitioning said chamber into a vacuum compartment and an atmosphere compartment, a passage connecting said vacuum compartment with the second-named conduit, and means for admitting atmospheric air to said second-named conduit to compensate for leakage past said valve, as and for the purpose set forth.

2. In a pressure regulating valve of the kind described, a conduit exposed to vacuum, a conduit in which the degree of vacuum is to be maintained constant, a throat connecting said conduits, a valve controlling the effective cross sectional area of said throat, a diaphragm chamber, a flexible loaded diaphragm partitioning said chamber into a vacuum compartment and an atmosphere compartment, and a passage connecting said vacuum compartment with the second-named conduit, said diaphragm chamber having a small aperture for admitting atmospheric air to said second-named conduit to compensate for leakage past said valve, as and for the purpose set forth.

In testimony whereof I have signed my name to this specification.

ARCHD. RUSSELL MILLER.